3,528,502
WATERFLOOD PROCESS USING PHOSPHATED
HYDROXYAMINES AS SCALE INHIBITORS
Donald C. Oleen, Houston, Tex., assignor to Nalco
Chemical Company, Chicago, Ill., a corporation of
Delaware
No Drawing. Filed Nov. 25, 1968, Ser. No. 778,808
Int. Cl. C09k 3/00; E21b 43/02
U.S. Cl. 166—275                                10 Claims

ABSTRACT OF THE DISCLOSURE

Phosphated hydroxyamines obtained by reacting polyphosphoric acid and/or phosphorous pentoxide with hydroxyamines, e.g., diethanolamine or triethanolamine, with or without neutralization, are introduced into one or more water injection wells and forced through the underground formation to a producing well or wells without being destroyed during such passage.

---

This invention relates to a method of treating water introduced into underground formations, and more particularly to a method of treating water which is forced into the producing formation in the secondary recovery of oil or in the disposal of waste water and brines from oil and gas wells.

When an oil well ceases to flow by the natural pressures in the formation and/or substantial quantities of oil can no longer be obtained by the usual pumping methods, various processes are sometimes used for the treatment of the oil-bearing formation in order to increase the flow of oil. These processes are usually described as secondary recovery processes. One such process which is used quite frequently is the waterflooding process wherein water is pumped under pressure into what is called an "injection well" and oil, along with quantities of water, that have been displaced from the formation, are pumped out of an adjacent well usually referred to as a "producing well." The oil which is pumped from the producing well is then separated from the water that has been pumped from the producing well and the water is pumped into the injection well. Supplementary water from other sources may also be used in conjunction with the produced water. When the storage reservoir is open to the atmosphere and the oil is subject to aeration, this type of waterflooding system is referred to herein as an "open waterflooding system." If the water is recirculated in a closed system without substantial aeration, the secondary recovery method is referred to herein as a "closed waterflooding system."

The water which is introduced into the injection wells may vary considerably in composition from one field to another. Frequently, it contains relatively large quantities of dissolved salts such as sodium chloride and therefore can be described as a brine. It may also contain other salts such as those of calcium, magnesium, barium and strontium. Some iron salts may likewise be present. In some cases these salts are added to a fresh water to prevent clay minerals from swelling and sealing off porous oil sands, but in most instances their occurrence is natural.

Some of the difficulties heretofore encountered in waterflooding operations are the plugging of surface equipment, injection wells and formation due to numerous factors but particularly because of the formation of insoluable salts in the system and on the face of the formation, the growth of micro-organisms which form solids that tend to plug the equipment and formation and the corrosion of equipment used in the system with the attendant formation of products of corrosion which tend to plug the formation. The plugging of the formation makes it necessary to use increased pressures in order to force the water into the injection wells and this in turn greatly increases the cost of secondary oil recovery operations by waterflooding methods, making such methods impractical in many instances. The corrosion problem also makes it necessary to replace the equipment at frequent intervals thereby increasing the cost of the secondary oil recovery operation.

Inorganic polyphosphates have been added to water in waterflood systems in an effort to alleviate corrosion and scale formation.

The polyphosphates suffer from the objection that under the conditions present in an oil-bearing formation they can undergo reversion to orthophosphates which in turn form insoluble salts with calcium, magnesium, barium and strontium. Calcium and magnesium are usually present in substantial amounts in oil-bearing formations and barium and strontium salts are often present in smaller amounts. The formation of insoluble salts as previously indicated would tend to plug the oil-bearing strata and reduce the chances of obtaining an improvement in the recovery of the oil.

It would be desirable to provide a process in which a chemical is added to an injection well which will inhibit scaling of equipment and plugging of the well and will retain its identity while passing through the underground formation to the producing well or wells where it is also effective as a scale inhibitor. An object of this invention is to provide such a process.

In accordance with the invention it has been found that certain phosphated hydroxyamines which are effective as scale inhibitors can be added to an injection well or wells in a waterflood system and will pass through the underground formation to a producing well or wells without or wells as the injection well or wells. This protection is afforded against scale formation in the producing well or well as the injection well or wells. This protection is especially useful in a number of areas where scaling of metal surfaces, particularly ferrous metal surfaces, by barium sulfate, calcium sulfate and/or calcium carbonate is a problem. By control of scale formation, breakdowns, maintenance, cleaning and repairs caused or necessitated by scale formation can be minimized.

The products provided for the purpose of the invention can be described as polyphosphoric acid esters of hydroxy amines. They are preferably prepared by reacting the hydroxy amine with polyphosphoric acid and/or phosphorus pentoxide at elevated temperature, preferably in the order of about 50° C. to 175° C., although somewhat higher temperatures on the order of 200° C. to 250° C. can sometimes be used, depending upon the nature of the hydroxy amine reactant. In the early stages, the reaction is exothermic and care must be taken to control the temperature. The reaction time is preferably at least about 30 minutes. The reaction may be conducted for a longer period, however, e.g., up to three to five hours, to assure complete reaction. If desired, a catalyst, such as boron trifluoride etherate complex, may be used. When using polyphosphoric acid, the hydroxy amine can be added to the polyphosphoric acid liquid. Conversely, the phosphoric acid can be added to the hydroxy amine.

The resultant reaction product may be used as is, or it may be converted to a salt by partial to complete neutralization with an alkaline substance such as, for example, potassium or sodium hydroxide, potassium or sodium carbonate, ammonia, or a basic amino compound, e.g., tetramethyl ammonium hydroxide, methylamine, ethylamine, diethylamine, triethanolamine, diethanolamine, triethyl amine, ethylene diamine, diethylene triamine, pyridine, morpholine or other amine. The amine should preferably be a water soluble amine or at least one that does not destroy solubility in water.

The hydroxy amines can be relatively simple amines, such as diethanolamine or triethanolamine, or they can be core complex, such as the still residues obtained in the manufacture of triethanolamine or the products obtained by oxyalkylating amines. They can be monoamines or polyamines. They can have a single hydroxy group as in aminoethylethanolamine but preferably have a plurality of hydroxy groups. The oxyalkylated amines are obtained by reacting an alkylene oxide, for example, ethylene oxide or 1,2-propylene oxide, with an amine containing one or more reactive hydrogen atoms. The preferred amines contain at least one 2-hydroxy ethyl group $$(-CH_2CH_2OH)$$

provided by oxyethylation. The primary hydroxyl groups thereof are more effective than the secondary hydroxyl groups which would be provided by oxypropylation $$(-CH_2CH-OH)$$
$$\phantom{(-CH_2}|$$
$$\phantom{(-CH_2C}CH_3$$

However, oxypropylation may be used if the oxypropylated product is then oxyethylated to provide terminal 2-hydroxy ethyl groups. Ethylenediamine, for example, can be oxyethylated with four moles of ethylene oxide per mole of diamine to produce a diamine containing four 2-hydroxyethyl groups. By using both ethylene oxide and 1,2-propylene oxide, products can be obtained with both hydroxyethyl and hydroxypropyl groups. The extent of the oxyalkylation can also be increased by increasing the number of moles of alkylene oxide and in some cases, it is desirable to use as many as thirty moles of alkylene oxide per mole of amine. In general, however, this is not necessary for the purpose of the invention. Other amines which can be oxyalkylated to provide hydroxy amines are diethylenetriamine, triethylenetetramine and tetraethylene pentamine. It is normally desirable that the hydroxy group which is to be phosphated should be separated from the nitrogen atom by at least one carbon atom and preferably by at least two carbon atoms as in the 2-hydroxyethyl group. Amines of this general structure are sometimes referred to as hydroxyalkyl amines or alkanolamines. It will be understood that mixtures of hydroxy amines as well as individual amines can be employed in preparing the phosphate esters. Hence, the products can consist of mixed phosphate esters and mixtures of phosphate esters of the hydroxy amines.

The resultant phosphate esters have an average of at least one and up to all of the hydroxyls of the amine replaced by phosphate ester groups derived from polyphosphoric acid or phosphorus pentoxide, said phosphate ester groups consisting essentially of one or both of a member selected from the group consisting as $$\begin{array}{cc} \text{O} & \text{O} \\ \| & \| \\ -\text{O}-\text{P}-\text{OH} \quad \text{and} \quad -\text{O}-\text{P}-\text{O}- \\ | & | \\ \text{OH} & \text{OH} \end{array}$$

As previously indicated, the compounds provided by the invention include not only the free esters but also the salts of the esters derived by the partial to complete neutralization of the phosphate ester groups.

The invention will be further illustrated but is not limited by the following examples in which the quantities are stated in parts by weight unless otherwise indicated.

EXAMPLE I 100 parts of a fully oxyethylated ethylenediamine made by reacting 4 moles of ethylene oxide with 1 mole of ethylenediamine was added to the reaction vessel and 25 parts of polyphosphoric acid was added gradually with agitation while allowing the temperature of the reaction mixture to increase to 100° C. The temperature was held at 100° C. for 30 minutes. The reaction product was then cooled and 20 parts of N-propanol and 150 parts of water were added.

EXAMPLE II 50 parts of polyphosphoric acid was added to 100 parts of a triethanolamine residue (Amine N-1) and the mixture was agitated with temperature control while allowing the temperature to increase to 100° C. The reaction mixture was then cooled and 150 parts of water added.

EXAMPLE III 400 parts of polyphosphoric acid was added to 250 parts of triethanolamine residue (Amine N-1) with agitation while allowing the temperature to increase to 105° C. The mixture was then heated to 130° C. and held at that temperature for one hour. It was then cooled and 250 parts of water added.

EXAMPLE IV 100 parts of polyphosphoric acid was added to 200 parts of aminoethylethanolamine which had previously been heated to 70° C. During the addition, the reaction mixture was agitated and the temperature was allowed to increase to 120° C. It was held at 120° C. for 30 minutes, then cooled and 600 parts of water added.

EXAMPLE V 200 parts of the product obtained in Example III was mixed with 100 parts of 50% liquid caustic soda.

EXAMPLE VI 400 parts of polyphosphoric acid was added to 250 parts of triethanolamine residue (Alkanolamine SB) in a reaction vessel with agitation and the temperature was allowed to increase to 200° C. The reaction mixture was then cooled and 250 parts of water added.

EXAMPLE VII 125 parts of triethanolamine residue (Amine N-1) was mixed with 125 parts of a blend of 60% N,N'-diethanolethylenediamine and 40% N,N'-tetraethanolethylenediamine and the mixture heated to 50° C. The mixture of amines was then added to 400 parts of polyphosphoric acid with agitation while allowing the temperature to increase to 150° C. The mixture was held at 150° C. for 30 minutes, then cooled below 100° C. and then 250 parts of water added.

EXAMPLE VIII 300 parts of the product obtained in Example VII was mixed at ambient temperature with 100 parts of 50% liquid caustic soda.

EXAMPLE IX 400 parts of polyphosphoric acid was added to 300 parts of triethanolamine residue (Amine N-1) in a reaction vessel with agitation while allowing the temperature to rise to 140° C. The mixture was cooled below 100° C. and 300 parts of water added.

EXAMPLE X

A mixture of 125 parts of triethanolamine residue (Alkanolamine SB) and 125 parts of triethanolamine residue (Amine N-1) was heated to 50° C. and 400 parts of polyphosphoric acid was slowly added with agitation while allowing the temperature to increase to 145° C. The resultant product was cooled to 100° C. and 250 parts of water added.

EXAMPLE XI

An oxyethylated polyamine was prepared by reacting 37 parts of ethylene oxide with 63 parts of commercial polyamine (Polyamine H Solids) and 300 parts of this product was neutralized with 125 parts of 99% acetic acid. The product was cooled to 80° C. and 100 parts of N-propyl alcohol was added. 100 parts of polyphosphoric acid was then added while allowing the temperature to increase to 130° C. The temperature was held at 130° C. for 30 minutes. Thereafter, the product was cooled to 90° C. and 300 parts of water added.

EXAMPLE XII 100 parts of the oxyethylated polyamine described in Example XI was neutralized with 50 parts of 99% acetic acid while keeping the temperature below about 90° C. To this product was then added 350 parts of triethanolamine residue (Amine N–1). 700 parts of polyphosphoric acid was added to this mixture with agitation while allowing the temperature to increase to 130° C. The reaction mixture was held at this temperature for one hour, then cooled to 95° C. and 300 parts of water added.

EXAMPLE XIII 100 parts of the product of Example XII was mixed with 50 parts of 50% liquid caustic soda.

EXAMPLE XIV 400 parts of polyphosphoric acid was heated to 70° C. and 250 parts of triethanolamine residue (Amine N–1) was added with agitation while maintaining the temperature of the reaction mixture at 100–110° C. This temperature was maintained during ¾ of the hydroxy amine addition and during the last ¼ of said addition the temperature was increased to 130° C. It was held at 130° C. for 30 minutes. The product was cooled to 95° C. and 250 parts of water added.

EXAMPLE XV 125 parts of triethanolamine residue (Alkanolamine SB) and 125 parts of triethanolamine residue (Amine N–1) were blended with agitation while heating to 50° C. and the blend was added to 400 parts of polyphosphoric acid with agitation at a rate which allowed the temperature of the reaction mixture to increase to 150° C. The reaction mixture was held at 150° C. for 30 minutes, then cooled below 100° C. and 250 parts of water added.

EXAMPLE XVI 300 parts of triethanolamine residue (Amine N–1) and 100 parts of fully oxyethylated ethylenediamine (see Example I) were blended with agitation and heated to 50° C. The mixture of hydroxy amines was then added to 750 parts of polyphosphoric acid at 70° C. with agitation while allowing the temperature of the reaction mixture to increase to 130° C. The temperature was held at 130° C. for 30 minutes. The product was cooled to below 100° C. and 700 parts of water added.

EXAMPLE XVII 100 parts of the product of Example XVI was mixed with 50 parts of liquid caustic soda.

EXAMPLE XVIII 300 parts of N,N'-tetraethanolethylenediamine heated to 50° C. was added to 430 parts of polyphosphoric acid heated to 70° C. with agitation and the temperature of the mixture was allowed to increase to 130° C. It was held at 130° C. for 30 minutes, cooled to below 100° C. and 500 parts of water added.

EXAMPLE XIX

The process was the same as in Example XVIII except that 860 parts of polyphosphoric acid was employed and 800 parts of water was added.

EXAMPLE XX 300 parts of diethanolamine was added to 480 parts of polyphosphoric acid previously heated to 70° C. with agitation and the temperature of the reaction mixture was allowed to increase to 130° C. It was held at 130° C. for 30 minutes, then cooled below 100° C. and 500 parts of water added.

EXAMPLE XXI

The procedure was the same as in Example XX except that 960 parts of polyphosphoric acid was employed and 800 parts of water was added.

EXAMPLE XXII

The composition of Example II was injected into the water of an injection well in a quantity of ten parts per million parts of water in a West Texas oil field where an injection well was spaced about 200 to 300 yards from each of four producing wells. The floodwater was forced from the injection well to the producing wells. The scale inhibiting phosphate ester was carried along undergound to the producing wells and afforded protection to the equipment in the injection well and the producing wells while also inhibiting underground plugging.

The compositions of Examples I and III to XXI can be similarly employed.

The arrangement of injection and producing wells can be varied. Thus, a line drive arrangement can be used, or a single injection well and either six or eight surrounding producing wells can be used, or a plurality of injection wells can be used around one or more producing wells.

The dosage of the phosphated hydroxyamine is preferably around 10 parts per million (p.p.m.) and will normally be within the range of 0.5 to 100 p.p.m. but in some cases higher dosages, even as high as 200 to 500 p.p.m., can be used.

While the phosphated hydroxyamines in the examples have been prepared by using a commercial grade of polyphosphoric acid, also called "115% phosphoric acid," it will be understood that the reaction can also be carried out with phosphorous pentoxide or with a mixture of polyphosphoric acid and phosphorous pentoxide.

The hydroxyamine used in preparing the phosphated hydroxyamine should preferably contain more than one hydroxyl group. Compounds made from amines containing more than one hydroxyl group and especially those containing at least three and up to six hydroxyl groups are more effective and can be used at lower dosages. The hydroxyl group of the amine is preferably separated from a nitrogen atom of the amine by two to six carbon atoms, e.g., an alkylene group, such as ethylene, propylene, butylene, and homologues. The starting amine is preferably at least partially soluble in water and the end product is preferably soluble in water at the concentrations of use.

So much of this application as relates to the phosphated hydroxyamines and their preparation is described in U.S. Ser. No. 600,354 filed Dec. 9, 1966, now U.S. Pat. No. 3,477,956 and does not form a part of this invention. Nor is this invention concerned with general uses of the type described and claimed in said application. On the contrary, the present invention is based upon the discovery that certain types of chemical compounds as described herein which are effective as scale inhibitors can be forced through an underground formation from an injection well to at least one producing well. Many other types of compounds do not have this property and will be absorbed by the formation.

The invention is hereby claimed as follows:

1. In a waterflood system in which water is added to one or more injection wells in order to force oil from underground formations to one or more producing wells, the process which comprises introducing a scale inhibiting amount of a phosphated hydroxyamine obtained by reacting polyphosphoric acid, phosphorous pentoxide or a mixture of polyphosphoric acid and phosphorous pentoxide with a water soluble hydroxyamine into at least one injection well and forcing said phosphated hydroxyamine through the underground formation to at least one producing well.

2. A process as claimed in claim 1 in which said phosphated hydroxyamine is used in a dosage within the range of 0.5 to 100 parts per million parts of said water.

3. A process as claimed in claim 1 in which the dosage of said phosphated hydroxyamine is approximately 10 parts per million parts of said water.

4. A process as claimed in claim 1 in which said phosphated hydroxyamine is at least partially neutralized to form a salt.

5. A process as claimed in claim 1 in which said phosphated hydroxyamine contains at least three hydroxyl groups which are connected to one or more nitrogen atoms of said amine through alkylene groups containing 2 to 6 carbon atoms.

6. A process as claimed in claim 1 in which said hydroxyamine contains at least two hydroxyethyl groups.

7. A process as claimed in claim 1 in which said hydroxyamine comprises triethanolamine.

8. A process as claimed in claim 1 in which said hydroxyamine is an adduct of ethylene oxide and a polyalkylene polyamine.

9. A process as claimed in claim 1 in which said hydroxyamine comprises N,N'-tetraethanolethylenediamine.

10. A process as claimed in claim 1 in which said hydroxyamine comprises both triethanolamine and N,N'-tetraethanolethylenediamine.

References Cited

UNITED STATES PATENTS

| | | | |
|---|---|---|---|
| 2,429,593 | 10/1947 | Case | 252—8.55 |
| 2,470,830 | 5/1949 | Monson | 252—8.55 |
| 2,470,831 | 5/1949 | Monson | 252—8.55 |
| 2,777,818 | 1/1957 | Gambill. | |
| 3,191,676 | 6/1965 | Froning | 166—275 |
| 3,258,071 | 6/1966 | Yu Shen et al. | 166—275 |
| 3,288,217 | 11/1966 | Ralston | 252—8.55 X |
| 3,477,956 | 11/1969 | Stanford et al. | 252—8.55 |

STEPHEN J. NOVOSAD, Primary Examiner

U.S. Cl. X.R.

166—279

PO-1050
(5/69)

UNITED STATES PATENT OFFICE
CERTIFICATE OF CORRECTION

Patent No. 3,528,502  Dated September 15, 1970

Inventor(s) Donald C. Oleen

It is certified that error appears in the above-identified patent and that said Letters Patent are hereby corrected as shown below:

Column 2, line 34 , "or wells as the injection well or wells. This" should read -- being destroyed during such passage. Thus, -- ; line 36, "well" should read -- wells --.

Column 3, line 2, "core" should read -- more --; line 51, "as" should read -- of --.

SIGNED AND
SEALED
NOV 17 1970

(SEAL)
Attest:

Edward M. Fletcher, Jr.
Attesting Officer

WILLIAM E. SCHUYLER, JR.
Commissioner of Patents